(12) United States Patent
Larsson

(10) Patent No.: US 10,725,160 B2
(45) Date of Patent: Jul. 28, 2020

(54) NON-INVASIVE RADAR LEVEL GAUGE

(71) Applicant: Rosemount Tank Radar AB, Mölnlycke (SE)

(72) Inventor: Stig Larsson, Sävedalen (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 421 days.

(21) Appl. No.: 15/481,789

(22) Filed: Apr. 7, 2017

(65) Prior Publication Data
US 2018/0292519 A1    Oct. 11, 2018

(51) Int. Cl.
| | |
|---|---|
| G01S 13/02 | (2006.01) |
| H01Q 1/22 | (2006.01) |
| F16B 47/00 | (2006.01) |
| G01F 25/00 | (2006.01) |
| G01S 13/08 | (2006.01) |

(Continued)

(52) U.S. Cl.
CPC ............ *G01S 13/02* (2013.01); *F16B 47/006* (2013.01); *G01F 23/284* (2013.01); *G01F 25/0061* (2013.01); *G01S 13/08* (2013.01); *G01S 13/88* (2013.01); *H01Q 1/225* (2013.01); *H01Q 13/02* (2013.01); *H01Q 13/20* (2013.01)

(58) Field of Classification Search
CPC .............................. B65D 90/48; G01F 23/2845
See application file for complete search history.

(56) References Cited

U.S. PATENT DOCUMENTS

| | | | | |
|---|---|---|---|---|
| 3,748,637 | A | * | 7/1973 | Larson ................. G10K 11/004 |
| | | | | 310/326 |
| 4,044,355 | A | * | 8/1977 | Edvardsson .......... G01F 23/284 |
| | | | | 342/124 |

(Continued)

FOREIGN PATENT DOCUMENTS

| | | |
|---|---|---|
| DE | 102013112025 A1 † | 4/2015 |
| DE | 202011110687 U1 † | 9/2015 |

(Continued)

OTHER PUBLICATIONS

European Communication/Search Report from EP Application No. 18164946.8, dated Aug. 30, 2018.

(Continued)

*Primary Examiner* — Bernarr E Gregory
(74) *Attorney, Agent, or Firm* — Westman, Champlin & Koehler, P.A.

(57) ABSTRACT

A radar level gauging arrangement for performing radar level gauging in a tank having a tank wall which is impermeable to a product held in the tank and transmissive to radar signals, comprising an attachment device configured to be secured to a substantially flat portion of said tank wall, without penetration of the tank wall, and a radar level gauge including a directional antenna, the radar level gauge being mounted to the attachment device, such that, when said attachment device is secured against the tank wall, the directional antenna is positioned so as to enable transmission of radar signals through the tank wall. By mounting a radar level gauge to an attachment device which can be secured to the tank wall without penetrating the tank wall, radar level gauging can thus be provided without damaging or interfering with the tank.

23 Claims, 6 Drawing Sheets

(51) Int. Cl.
*G01S 13/88* (2006.01)
*H01Q 13/20* (2006.01)
*G01F 23/284* (2006.01)
*B65D 90/48* (2006.01)
*H01Q 13/02* (2006.01)
*G01S 13/00* (2006.01)

(56) References Cited

U.S. PATENT DOCUMENTS

| | | | | |
|---|---|---|---|---|
| 4,107,993 A * | 8/1978 | Shuff | G01F 23/284 324/640 |
| 4,205,315 A * | 5/1980 | Fleenor | G01F 23/284 342/124 |
| 4,234,882 A * | 11/1980 | Thompson | G01S 13/32 342/124 |
| 4,269,383 A * | 5/1981 | Hackman | F16M 11/041 248/216.4 |
| 4,290,067 A * | 9/1981 | Legille | G01F 23/284 342/124 |
| 4,332,374 A * | 6/1982 | Kremer | G01S 13/88 266/100 |
| 4,566,321 A * | 1/1986 | Zacchio | G01F 23/284 324/643 |
| 4,641,139 A * | 2/1987 | Edvardsson | G01F 23/284 342/124 |
| 4,833,918 A * | 5/1989 | Jean | G01F 23/284 324/643 |
| 5,351,036 A * | 9/1994 | Brown | G01F 23/2845 340/618 |
| 5,438,868 A * | 8/1995 | Holden | G01F 23/2968 342/124 |
| 5,507,181 A * | 4/1996 | Fox | G01F 23/284 342/124 |
| 5,594,449 A * | 1/1997 | Otto | G01F 23/284 340/612 |
| 5,767,407 A * | 6/1998 | Sinha | G01N 29/036 702/54 |
| 6,192,752 B1 * | 2/2001 | Blaine | G01F 23/284 73/290 R |
| 6,691,570 B1 * | 2/2004 | Neuhaus | G01F 23/284 324/643 |
| 7,114,390 B2 * | 10/2006 | Lizon | G01F 23/2966 73/290 V |
| 7,173,436 B2 * | 2/2007 | Edvardsson | G01F 23/284 324/644 |
| 7,898,496 B2 | 3/2011 | Olsen et al. | |
| 8,069,722 B1 * | 12/2011 | Jannotta | G01F 23/284 73/290 V |
| 8,482,295 B2 * | 7/2013 | Sadri | G01F 23/284 164/154.2 |
| 10,180,343 B2 * | 1/2019 | Merker | G01F 23/2968 |
| 2006/0021448 A1 * | 2/2006 | Young | G01F 23/2966 73/861.18 |
| 2007/0180903 A1 * | 8/2007 | Gao | G01F 23/2968 73/290 V |
| 2007/0245824 A1 * | 10/2007 | Blokhuis | G01F 23/74 73/313 |
| 2009/0193888 A1 | 8/2009 | Rayner et al. | |
| 2011/0184668 A1 * | 7/2011 | Juchniewicz | G01F 23/284 702/45 |
| 2011/0221629 A1 * | 9/2011 | Edvardsson | G01F 23/284 342/124 |
| 2013/0228011 A1 | 9/2013 | Pohl et al. | |
| 2016/0025264 A1 | 1/2016 | Casagrande | |

FOREIGN PATENT DOCUMENTS

| | | |
|---|---|---|
| DE | 102015113908 A1 † | 2/2017 |
| EP | 1070941 A1 † | 1/2001 |
| GB | 2 438 626 | 12/2007 |
| JP | 10-234734 | 9/1998 |
| WO | 2009026672 A1 † | 3/2009 |

OTHER PUBLICATIONS

Radar Level Measurement, The User's Guide, Vega Controls, partly in German, 154 pgs., 2000.
Radar Level Measurement, The User's Guide, Vega Controls, pp. 134-135 English translation, 2000.
Nivelco Product Catalogue, pp. 1-234, Feb. 2017, https://nivelco.com/public/files/documents/11b7bf34-a321-471d-964db4e50004e1d1/nikat17a0611b.pdf, (Accessed Apr. 16, 2019).†
"Arjay Automation Process Instrumentation and Power Utility Blog," pp. 1-2, Mar. 9, 2016, https://blog.arjaynet.com/2016/03/innovative-non-contact-tote-level.html (Accessed Apr. 16, 2019).†

\* cited by examiner
† cited by third party

NON-INVASIVE RADAR LEVEL GAUGE

FIELD OF THE INVENTION

The present invention relates to a radar level gauging arrangement for performing radar level gauging through a radar transmissive tank wall.

BACKGROUND OF THE INVENTION

Contact free radar level gauging is widely used for level gauging in tanks. Traditionally, radar level gauging has been used in relatively large tank installations, such as refinery tanks and tanks on cargo ships. However, applications also include smaller tanks, e.g. in process industry. When the tank is made of metal, the radar level gauge must be mounted in an opening in the tank wall, in order for the radar signals to enter the tank.

However, there also exists a large variety of commercially available storage tanks made of non-metal materials, including plastics and other materials which are transmissive to microwaves. Some tanks are portable and used for transport, while others are stationary and used mainly for storage. Fields of use include water (and rain water) storage, chemical storage, septic tanks, etc.

For such tanks, mounting in an opening in the tank wall is not necessary, and may also be technically difficult. In some cases, the tank walls are flexible, and a hole in the tank wall may not provide sufficient structural strength.

Further, many smaller tanks are manufactured in large series, and under significant cost pressure. Therefore, it is not feasible to equip the tanks with a specific interface for mounting a radar level gauge at time of production.

Based on the above, it would be desirable to provide a radar level gauge which can easily be retro-fitted to existing tanks made of a radar transmissive material, without damaging or otherwise interfering with the tank.

GENERAL DISCLOSURE OF THE INVENTION

It is an object of the present invention to fulfill the above requirements.

According to a first aspect of the invention, this object is achieved by a radar level gauging arrangement for performing radar level gauging in a tank having a tank wall which are impermeable to a product held in the tank and transmissive or transparent to radar signals, comprising an attachment device configured to be secured to a substantially flat portion of the tank wall, without penetration of the tank wall, and a radar level gauge including a directional antenna, the radar level gauge being mounted to the attachment device, such that, when the attachment device is secured against the tank wall, the directional antenna is positioned so as to enable transmission of radar signals through the tank wall, thereby enabling determination of a filling level in the tank.

The invention is based on the realization that radar level gauging in many situations may be performed through the walls of the tank containing the product to be gauged. By mounting a radar level gauge to an attachment device which can be secured to the tank wall without penetrating the tank wall, radar level gauging can thus be provided without damaging or interfering with the tank. Such radar level gauging can be referred to as "non-invasive" radar level gauging.

According to some embodiments of the invention, the attachment device is a suction cup configured to be secured to the tank wall by means of partial vacuum created between the device and the tank wall. Attachment by suction is well known per se, and may be a simple, yet effective way of attaching the radar level gauge to many types of tank walls. Many types of suction cups for various applications are known in the art, and by mounting a radar level gauge to an appropriate suction cup a rudimentary radar level arrangement may be provided. A suction cup enables simple and reliable fastening on virtually any sufficiently smooth tank wall. For example, the surface of a plastic storage tank will typically be sufficiently smooth.

Other means of attachment include adhesive, gripping or engaging protruding parts of the tank, etcetera.

In some embodiments, the arrangement includes two or more suction cups, joined by a structure extending between the suction cups. The radar level gauge may then be mounted to the structure, preferably in between the suction cups. By including two or more suction cups, the attachment can become more reliable.

The at least one suction cup may include a connection terminal configured to be connected to an active source of sub-atmospheric pressure. In this case, the partial vacuum is created by the active source, e.g. a vacuum pump. Such active suction may provide a stronger suction attachment, especially as long as the active source is connected. The terminal may be provided with a sealing valve, to allow disconnection of the active source without removing the partial vacuum.

Another, potentially lower cost, option is that the suction cup is configured to allow a user to create the partial vacuum by mechanical operation of the suction cup.

A simple example of a mechanically operated suction cup includes an body with a ring-shaped surface, a bellows resting against the ring-shaped surface, the bellows configured to be placed between the body and the tank wall, and a bellows operating member attached to a portion of the bellows located within the ring-shaped surface, the bellows operating member being movably arranged with respect to the body between a first state, wherein the bellows is essentially coplanar with a plane of the ring-shaped surface, and a second state, in which the portion is brought out of the plane. When the suction cup is placed with the bellows sandwiched between the ring-shaped surface and the tank wall, and the bellows operating member is brought to its second state, the portion is pulled away from the tank wall. At the same time, the body is pressed against the wall, and the baffle is consequently sandwiched between the tank wall and the ring-shaped surface. Air is prevented from entering the compartment, thereby creating the partial vacuum between the bellows and the tank wall. By an appropriate selection of the material that the bellows is made of, the bellows will effectively seal the vacuum along the ring-shaped surface, thereby providing a durable and reliable suction attachment.

This type of suction cup, is widely used e.g. as glass handles, sometimes with several suction cups combined in one handle.

According to one embodiment, the radar level gauging arrangement comprises a suction cup including a main body having an inner ring-shaped surface and an outer ring-shaped surface, the inner and outer ring-shaped surfaces substantially extending in one single attachment plane, an annular bellows having an inner perimeter surrounding a central opening and an outer perimeter, a first side of the annular bellows configured to be placed against the tank wall, and a second side, opposite to the first side, facing the body with the inner perimeter aligned with the inner ring-shaped surface and the outer perimeter aligned with the outer ring-shaped surface, and a bellows operating member attached to a portion of the bellows extending between the inner and outer perimeter, the bellows operating member being movably arranged in relation to the main body to pull the portion into the main body away from the attachment plane. A radar level gauge including a directional antenna may then be mounted to the body such that the directional antenna is directed towards the central opening. When the suction cup is placed against the tank wall and the bellows is pulled away from the attachment plane, a partial vacuum is created between the annular bellows and the tank wall thereby securing the vacuum device and the radar level gauge with respect to the tank wall, whereby the directional antenna is positioned to emit radar signals through the tank wall in the central opening.

The baffle is here sandwiched between the tank wall and the two ring-shaped surfaces. The suction cup according to this embodiment can thus create a vacuum between the tank wall and the baffle in an annular compartment between the inner and outer ring-shaped surfaces. When the suction cup is attached to a tank wall, the central opening of the bellows provides direct access to the tank wall. As the radar level gauge is mounted with its antenna directed towards this opening, the RLG will be able to emit transmit signals which propagate through the tank wall and into the tank, and also be able to receive a reflected return signal through the tank wall.

The radar level gauge may be pivotably mounted to the attachment device, so that, when the attachment device is secured to the tank wall, the orientation of the directional antenna is adjustable with respect to a surface of the product in the tank. Such adjustable mounting may be advantageous if the tank wall is not perfectly horizontal. The directional antenna may then be slightly adjusted so that radar signals emitted from the antenna are directed substantially normal to the product surface, and reflected signals are directed substantially towards the antenna.

In order to prolong the duration during which the suction cup remains secured to the tank wall, an adhesive may be applied at least to an outer perimeter of the bellows, such that, when the suction cup is secured to the tank wall, the adhesive is pressed against the tank wall so as to create an adhesive bond. In this embodiment, the suction applied by the suction cup can be seen primarily as an effective way to ensure a satisfactory adhesive bond.

The ring-shaped surface(s) preferably has/have a width d of at least three millimeters, and preferable at least five millimeters, in order to compensate for small unevenness of the wall surface.

According to a second aspect of the invention, this object is achieved by a method for performing radar level gauging in a tank having a radar transmissive tank wall, providing a radar level gauge mounted to a suction cup, placing a bellows of the suction cup against a substantially flat portion of the tank wall, creating a partial vacuum between the bellows and the tank wall to secure the suction cup to the tank wall, thereby fixating the radar level gauge with respect to the tank wall, emitting radar transmit signals through the tank wall, receiving radar echo signals through the tank wall, the echo signals formed by reflection of the transmit signals in a product surface inside the tank, and determining a filling level of the tank based on a relationship between the transmit signals and the echo signals.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
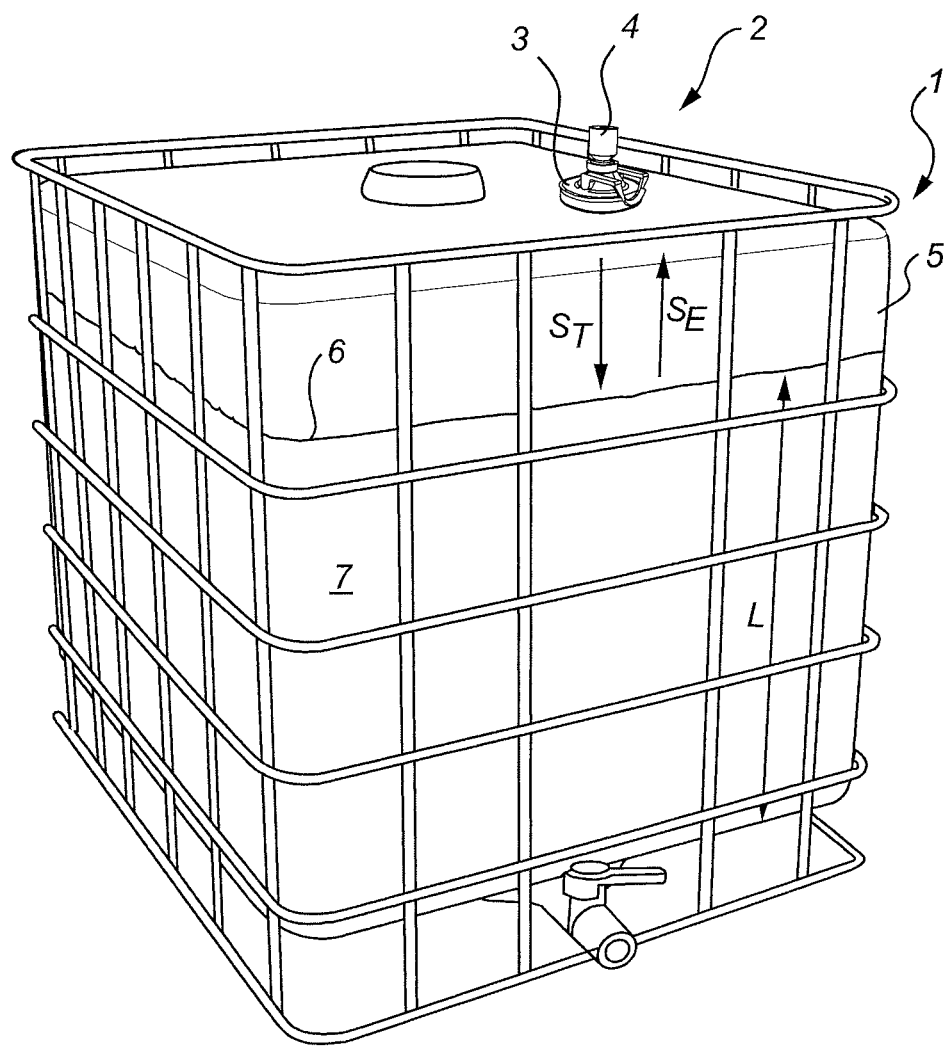
FIG. 1 shows a storage tank provided with a radar level gauging arrangement according to an embodiment of the present invention.

FIG. 1 shows a plastic storage tank 1 provide with a level gauging arrangement 2 according to an embodiment of the present invention. The illustrated tank is a so called intermediate bulk container (IBC), or pallet tank, which is a reusable industrial container designed for the transport and storage of bulk liquid and granulated substances, such as chemicals, food ingredients, solvents, pharmaceuticals, etc (for reference, see e.g. en.wikipedia.org/wiki/Intermediate bulk container). It is noted that the walls 5 of the container are impermeable to the product stored in the tank. However, the tank wall 5 are typically transmissive (or transparent) to radar signals, at least to such an extent that radar level gauging can be performed through the tank wall 5.

The radar level gauging arrangement 2 includes an attachment device, here a suction cup 3 firmly attached to the upper side of the tank, and a radar level gauge (RLG) 4 mounted to the suction device 3. The RLG 4 is configured to emit electromagnetic transmit signals ST through the tank wall 5 and into the tank. The transmit signals are reflected by a surface 6 of a product 7 in the tank, and an echo signal SE is returned to the RLG 4. A distance to the surface, and thus a filling level L, can be determined by a relationship between the transmit signal and the echo signal.

Figure 2A:
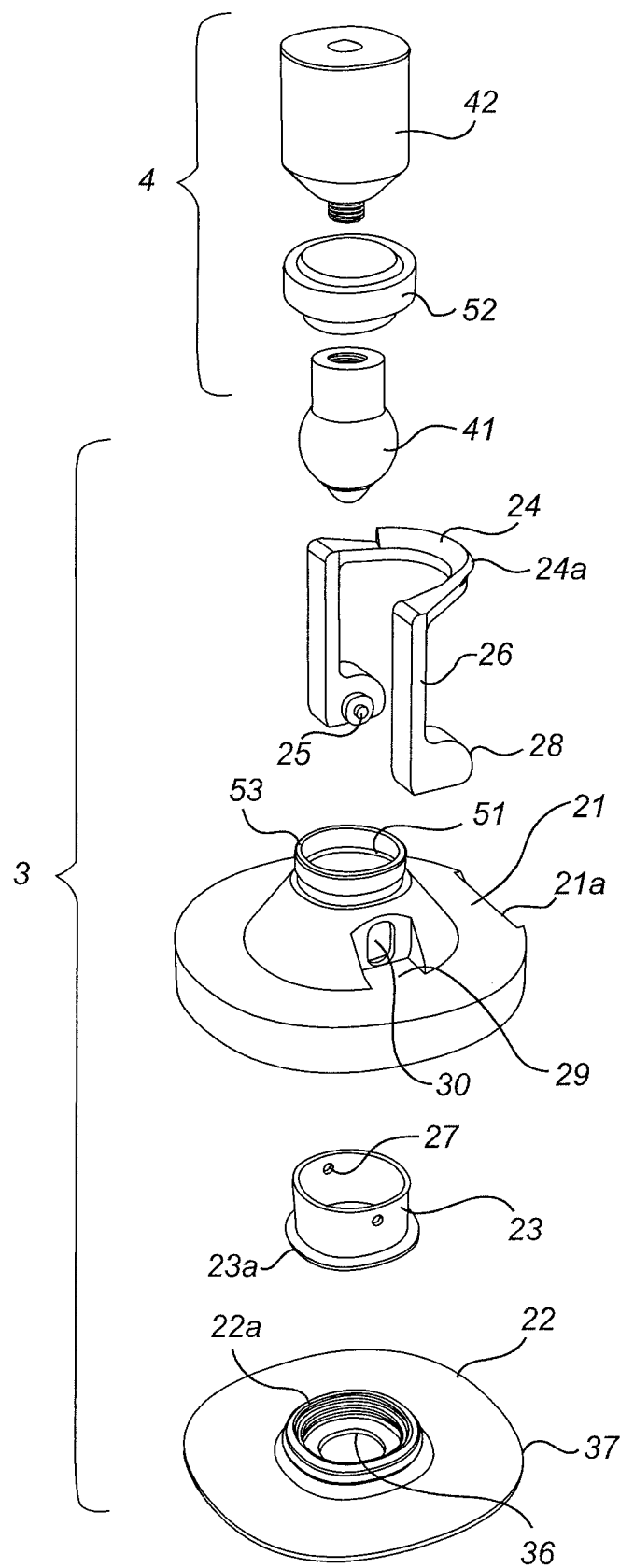
FIGS. 2a-2b show exploded perspective views of the radar level gauging arrangement in FIG. 1.
Figure 2B:
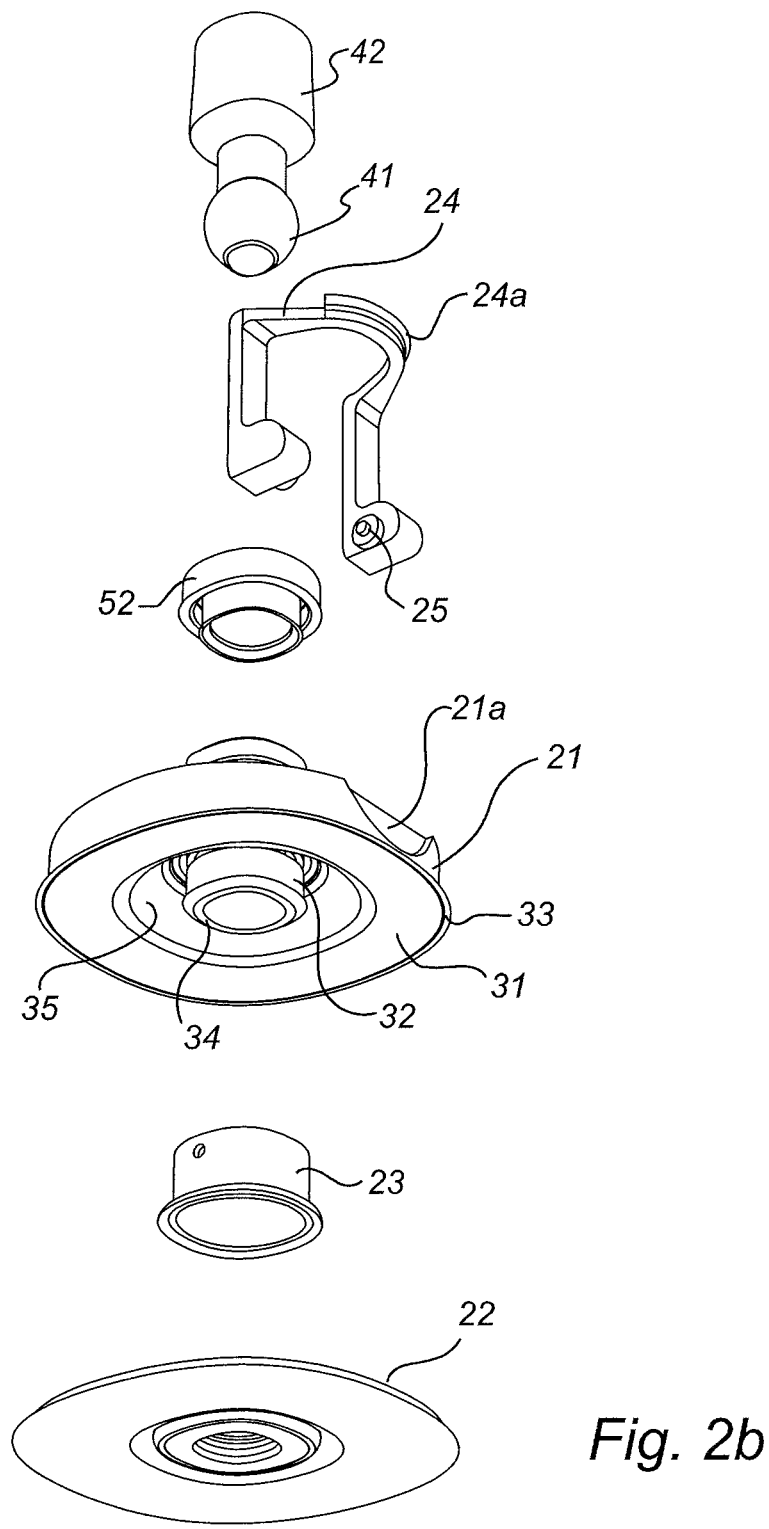

FIGS. 2a and 2b show the radar level arrangement 2 in FIG. 1 in more detail. The suction cup 3 here comprises a main body 21 and an annular bellows 22. The main body 21 includes a substantially bell-shaped outer portion 31, and an inner, substantially cylindrical portion 32. The outer perimeter 33 of the outer portion 31, and the lower edge 34 of the cylindrical portion 32 are here coaxial ring-shaped surfaces substantially in the same geometric attachment plane. The width d of these ring shaped surfaces (see FIG. 4b) may be at least three mm, and preferably at least five mm. Between the cylindrical portion 32 and the bell-shaped portion 31 is formed an interior space 35 delimited by the plane. The annular bellows 22 is arranged substantially in this plane, with its inner perimeter 36 aligned with the edge 34 and its outer perimeter 37 aligned with the perimeter 33.

The suction cup 3 further comprises a sleeve 23, coaxially arranged around the cylindrical portion 32 and axially movable in the space 35. The lower edge 23a of the sleeve 23 is operatively attached to an intermediate part 22a of the bellows 22, i.e. a part between the inner perimeter 36 and the outer perimeter 37. The sleeve 23 is further operatively linked to a lever 24 so as to be axially displaced by rotation of the lever 24. Displacement of the sleeve 23 will in turn lift the intermediate part 22a of the bellows 22 that is attached to the sleeve 23.

By "operatively attached" is here intended to indicate that the bellows 22 will be mechanically operated when the sleeve 23 is moved. For example, the sleeve can be fixedly attached, e.g. by welding, vulcanization or glue, to the bellows 22. Alternatively, the bellows can be otherwise mechanically engaged, e.g. by engaging the lower edge of the sleeve, which then preferably is protruding as indicated in FIGS. 2a and 2b.

In the illustrated case, the lever 24 is U-shaped, and each leg 26 is operatively connected to the sleeve 23 by means of a pin 25 extending through an opening 30 in the body 21. The pin 25 can for example be fixed to the leg 26 and extend into a hole 27 in each side of the sleeve 23. Each leg 26 of the lever 24 is further provided with a cam 28 that interacts with an abutment surface 29 of the main body, such that, when the lever is turned, both pins 25 will be forced upwards (away from the bellows 22) and bring the sleeve 23 along with it.

Figures 3A, 3B:
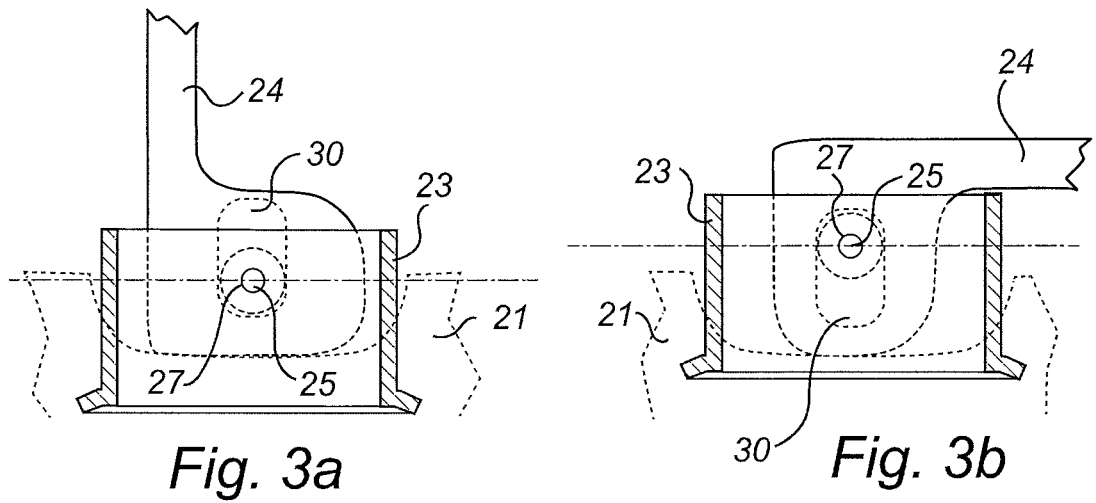
FIG. 3a shows the lever of the suction cup in FIG. 2a-2b in a first position.
FIG. 3b shows the lever of the suction cup in FIG. 2a-2b in a second position.

Operation of the lever 24 is shown in more detail in FIGS. 3a and 3b. In FIG. 3a, the lever 24 is in an upright position, and the sleeve 23 is in a first, lowered position. As the level 24 is turned (clockwise in FIG. 3a) the cam surface 28 will slide against the abutment surface 29, thereby forcing the pin 25 upwards, away from the abutment surface, bringing the sleeve 23 along with it. In FIG. 3b, the lever 24 as reached its end position, level with the upper surface of the body 21. In the illustrated case, see FIG. 2a, the body 21 has a recess 21a configured to receive the end portion 24a of the lever 24, thereby stabilizing the lever 24 in this end position. In this end position, the sleeve 23 has been moved to a second, raised position.

It is noted that references such as "lowered" and "raised" are used with reference to the surface onto which the attachment device 3 is placed. If the attachment device is placed on an inclined surface, the movement of the sleeve 23 will not be vertical, as indicated in FIG. 3a-b.

Figure 4A:
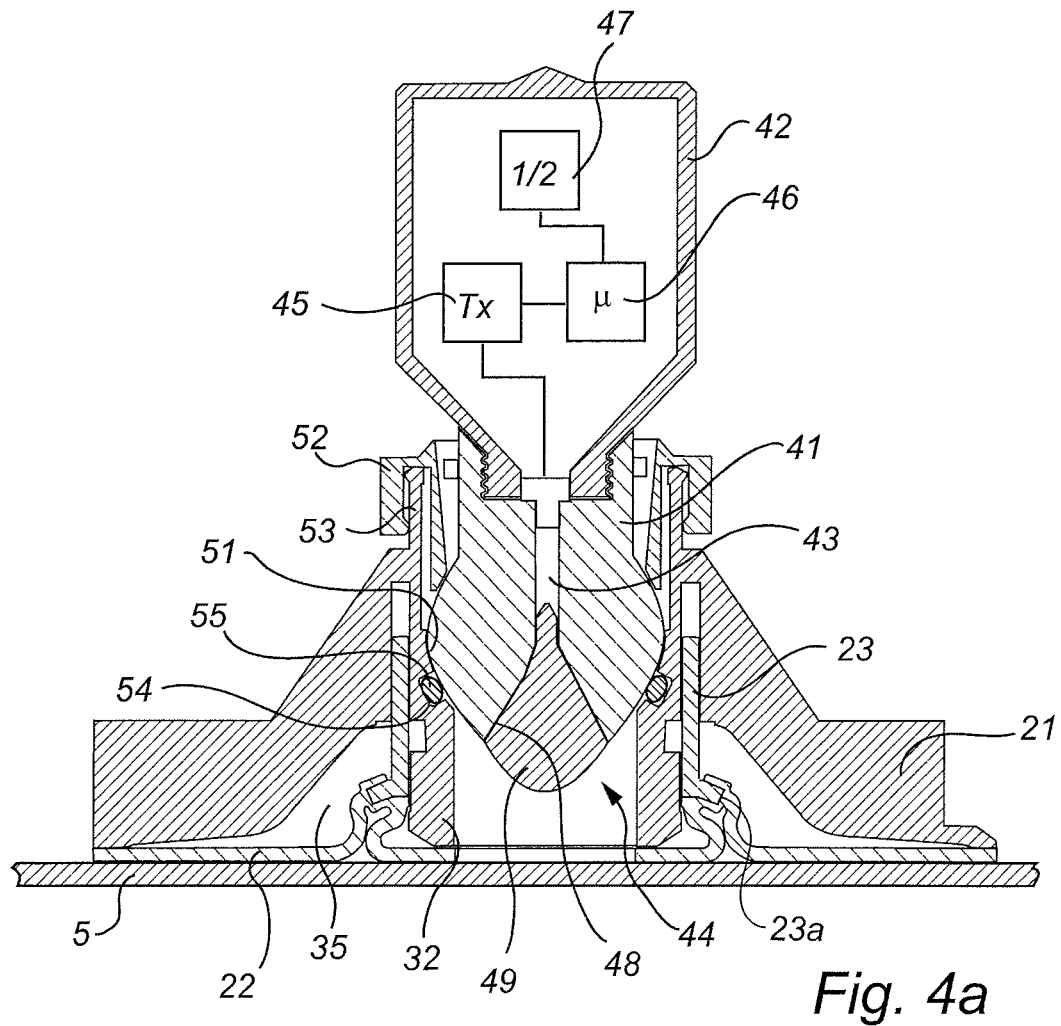
FIG. 4a shows a section view of the radar level gauging arrangement in FIG. 1 in a disengaged state.
Figure 4B:
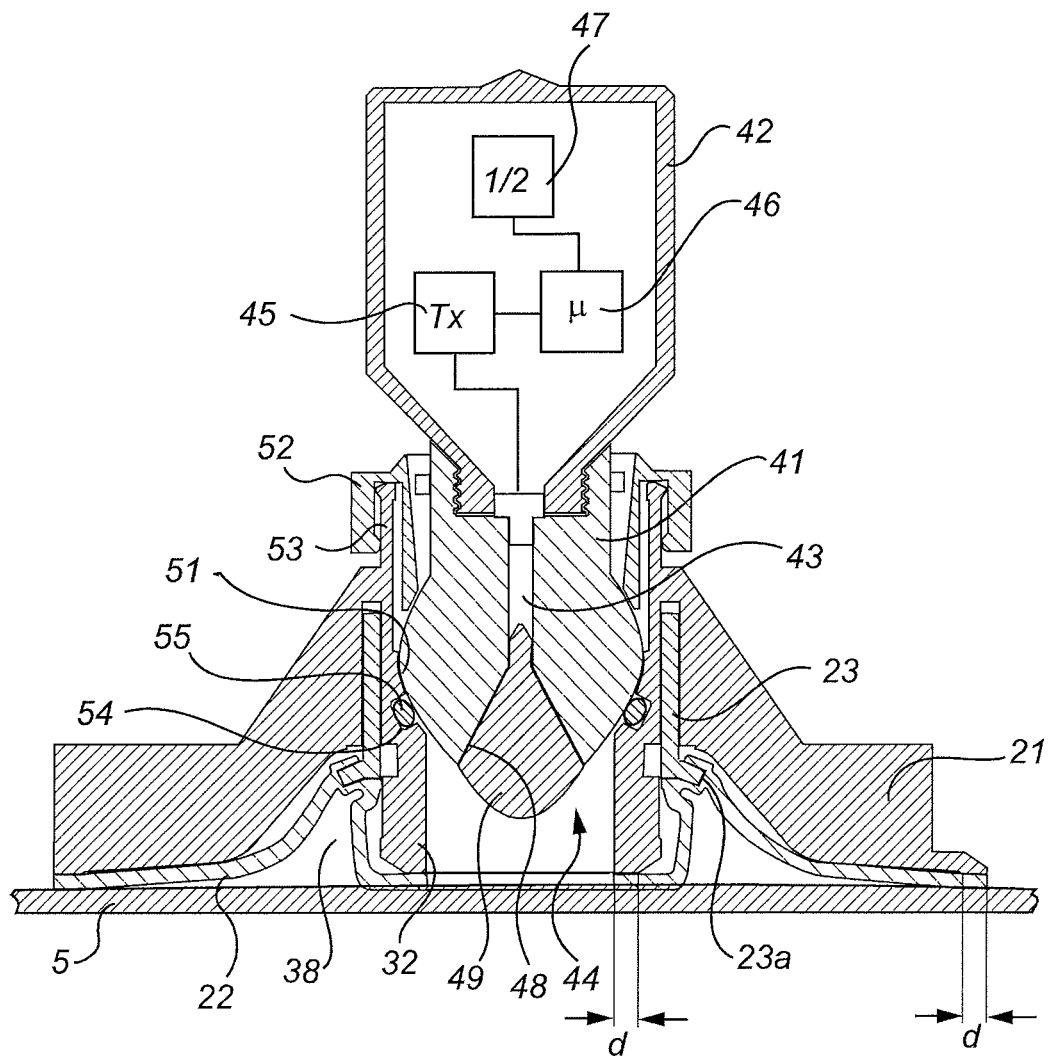
FIG. 4b shows a section view of the radar level gauging arrangement in FIG. 1 in an engaged state.

FIGS. 4a and 4b show the radar level gauging arrangement 2 placed with the bellows 22 of the suction cup 3 against a tank wall 5.

In FIG. 4a, the lever 24 in its upright position as illustrated in FIG. 3a, and the sleeve 23 lowered. Here, the sleeve 23 allows the bellows 22 to rest essentially flat against the tank wall 5, and the suction device 3 is thus disengaged from the tank wall. In FIG. 4b, the lever 24 is in its end position as illustrated in FIG. 3b, and the sleeve 23 is raised. The bellows 22, which is attached to the lower end of the sleeve 23, is thus separated from the tank wall 5 pulled into the space 35. Beneath the bellows 22 is now formed an annular compartment 38 delimited by the annular bellows 22 and the tank wall 5.

During the lifting of the sleeve 23, the inner perimeter 36 of the bellows will be sandwiched between the tank wall 5 and the lower edge 34 of the cylindrical portion 32. At the same time, the outer perimeter of the bellows 37 will be sandwiched between the tank wall 5 and the outer perimeter 33 of the bell-shaped portion 31. Ambient air is thus prevented from entering the compartment 38, and as the sleeve 23 is lifted and the volume of the compartment 38 increases, the pressure in the compartment 38 will therefore fall below the ambient pressure. A partial vacuum is thus formed in the compartment 38, effectively securing the suction cup 3 to the tank wall 5.

The material and thickness of the bellows 22 is selected such that the compartment 38 is effectively sealed from the ambient, in order to maintain the partial vacuum as long as possible. Further, the width of the ring-shaped surfaces 33 and 34 that press on the bellows 22 is chosen to compensate for minor unevenness in the tank wall surface. As an example, the width of these surfaces can be around 5 mm.

With time, however, ambient air will eventually enter the compartment 38, thereby removing the partial vacuum and disengaging the suction cup 3 from the tank wall 5. In order to prolong the time of engagement, the surface of the tank wall 5 may be treated to make it as smooth as possible, before mounting the suction cup 3. For example, the surface may be heated, polished or otherwise smoothed.

To even further increase the time of engagement, and potentially make the suction cup permanently attached to the tank wall 5, the outer perimeter 37 and/or the inner perimeter 36 of the bellows may be provided with an adhesive which is activated by pressure. In this embodiment, the suction provided by the partial vacuum in compartment 38 will serve to apply pressure on the adhesive, thereby adhesively attaching the bellows 22 to the tank wall 5. The adhesive attachment will maintain the partial vacuum even longer. Further, even if the partial vacuum in compartment 38 eventually deteriorates, the bellows 22—and the suction cup 3—will remain secured to the tank wall 5 by means of adhesion.

With reference to FIGS. 2a-2b and 4a-4b, the radar level gauge 4 comprises a waveguide portion 41 and a housing 42 mechanically fixed to the waveguide portion 41. The waveguide portion 41 forms a waveguide 43 extending between a directional antenna 44 arranged on the lower side of the waveguide portion, and transceiver circuitry 45 arranged in the housing 42. The housing also includes processing circuitry 46, and any I/O circuitry 47 required.

In the illustrated case, the waveguide portion is a solid piece of electrically conducting material, e.g. metal, and the waveguide 43 and antenna horn 48 are formed directly in this solid piece. Alternatively, the waveguide portion is made of a non-conducting rigid material, e.g. a ceramic material, and the waveguide 43 and antenna 44 are formed by electrically conducting members inserted into the portion 41. In principle, such members may simply be an electrically conducting coating on the inside of the portion 41.

The antenna horn 48 is preferably filled with a dielectric filling member 49, which is sealed against the inside of the waveguide portion 41. The details of such sealing, as well as matching between the waveguide 43 and the dielectric filling member 49, will not be further discussed herein.

In the illustrated example, the RLG 4 is pivotly arranged in the cylindrical portion 32 of the main body 21. For this purpose, the waveguide portion 41 has a generally spherical shape, and is arranged to rest against an abutment 51 in the cylindrical portion 32. A fastening member, here an annular ring 52, is attached, e.g. snap fitted, to the upper edge 53 of the main body 21, so that the spherical waveguide portion 41 is sandwiched between the abutment 51 and the ring 52. The abutment 51 is preferably provided with a grove 54, wherein a suitable sealing element 55, such as an O-ring, can be arranged.

After securing the suction cup 3 to the tank wall 5, the radar level gauge 4 can be pivoted to ensure that the antenna 48 can emit signals normal to the surface 6 in the tank 1. For the illustrated radar level gauge, this in practice corresponds to orienting the radar level gauge 4 with its longitudinal axis vertical.

In the embodiment in FIGS. 2-4 the antenna is arranged to emit radar signals through the central opening of the bellows 21. It is noted that many materials that are suitable for the bellows will block or attenuate radar signals, and the central opening is therefore advantageous. However, if the bellows is made of a material which is transmissive to radar signals, then the bellows does not necessarily have a central opening.

Figure 5:
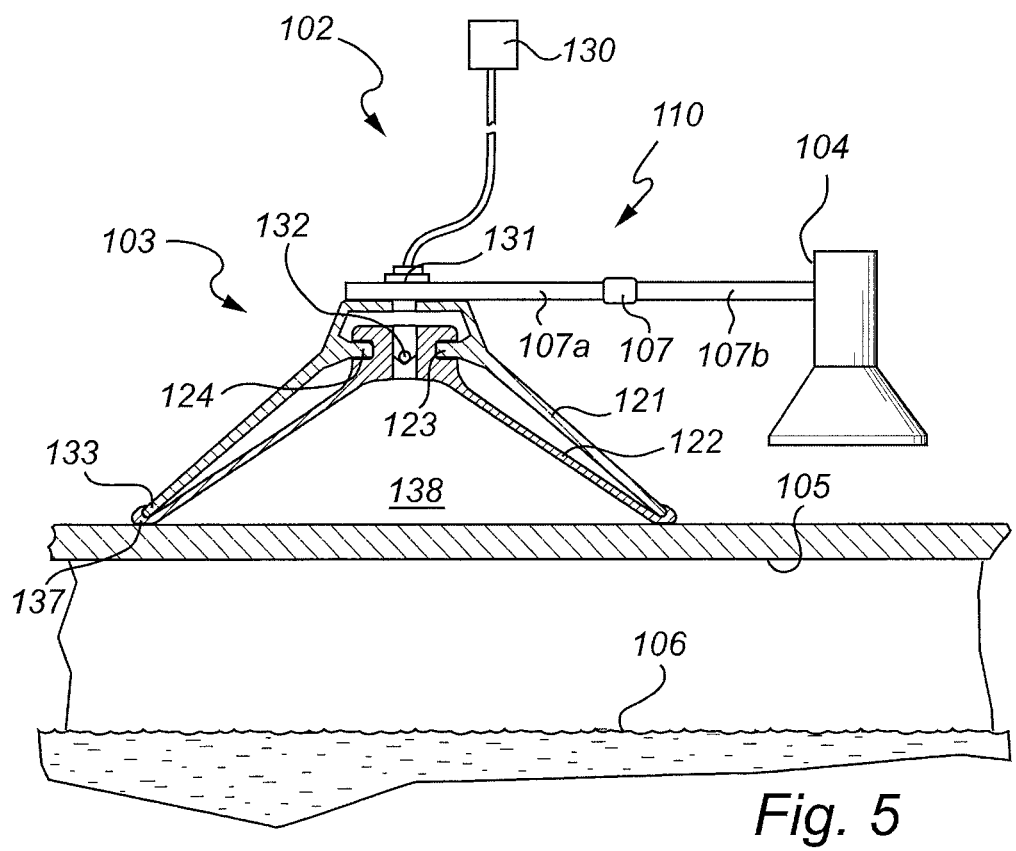
FIG. 5 shows a perspective view of a radar level gauging arrangement according to a further embodiment of the present invention.

FIG. 5 shows a further embodiment of the invention. The arrangement 102 here includes a suction cup 103 secured to a tank wall 105, and a radar level gauge 104 which is asymmetrically mounted with respect to the suction cup 103 by means of a mechanical structure 110.

The suction cup here includes a cup shaped body 121, and a cup shaped bellows 122 attached to the inside of the cup to form an air tight inner lining. In the illustrated case, the upper part of the bellows 122 has an annular recess 123 which is engaged with a flange 124 in the upper part of the body 121. The outer perimeter 137 of the bellows is sandwiched between the lower rim 133 of the body 121 facing the tank wall.

Alternatively, the bellows 122 is attached to the body 121 e.g. by welding, vulcanization or adhesion. In one example, the entire bellows 122 is adhesively attached (or laminated) to the inside of the body 121. Such a laminated suction cup may potentially support a greater vacuum and thus stronger attachment. However, a flexible bellows, as illustrated in FIG. 5, may be more forgiving to unevenness in the tank wall.

In this embodiment, the partial vacuum is not provided by displacement of the bellows. Instead, a source 130 of sub-atmospheric pressure is connected to a connection terminal 131 in the body. The connection terminal provides fluid access to the compartment 138 formed between the bellows 122 and the tank wall 105.

The source of sub-atmospheric pressure, here a vacuum pump 130, creates a partial vacuum in the compartment 138, thereby securing the suction cup 103 to the tank wall 105.

The terminal 131 may be provided with a pressure valve 132, preventing ambient air to enter the compartment 138. The source 130 may then be disconnected from the terminal 131 without releasing the suction cup 103 from the tank wall 105.

The mechanical structure 110 here includes a hinge 107 having a first end 107a mounted to the body 121 of the suction cup, and a second end 107b mounted to the radar level gauge 104. The hinge 107 allows alignment of the RLG, such that the signals emitted by the RLG are essentially normal to the product surface 106. It is noted that the hinge 107 may not be required in all applications.

Figure 6:
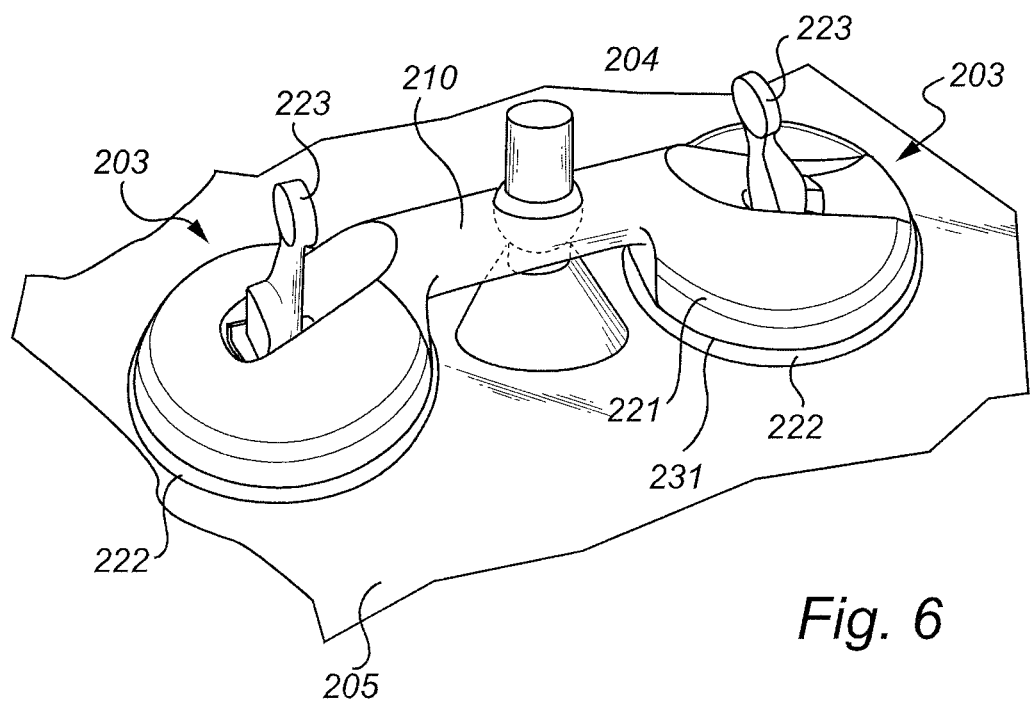
FIG. 6 shows a perspective view of a radar level gauging arrangement according to a further embodiment of the present invention.

FIG. 6 shows yet another embodiment, where the arrangement includes two suctions cups 203, and the RLG 204 is mounted on a structure 210 mounted to the body 221 of each suction cup 203 and extending between them. In the illustrated example, the RLG 204 is pivotably mounted in a manner similar to that disclosed in FIG. 4a-b above.

The suction cups 203 are here more conventional suction cups, of the type used e.g. for glass handles, and will only be briefly described herein. Each suction cup includes a bell-shaped body 221 and a bellows 222 arranged therein. A handle 223 is operable to move a central part of the bellows away from the tank wall 205, thereby increasing the volume of a compartment between the bellows 222 and the tank wall 205. As the lower ridge 231 of the body presses the outer perimeter of the bellows against the wall 205, air is prevented from entering the compartment and a partial vacuum is created.

It is noted that it may be preferably to have more than two suction cups, e.g. three suction cups or four suction cups.

The person skilled in the art realizes that the present invention by no means is limited to the preferred embodiments described above. On the contrary, many modifications and variations are possible within the scope of the appended claims. For example, the bellows is not necessarily annular, i.e. be formed without a central opening. In such a case, the radar level gauge may be mounted displaced from the suction device instead of being centrally mounted as in the above embodiment.

What is claimed is:

1. A radar level gauging arrangement for performing radar level gauging in a tank having a tank wall which is impermeable to a product held in the tank and transmissive to radar signals, comprising:
   an attachment device configured to be secured to a substantially flat portion of said tank wall, without penetration of the tank wall; and
   a radar level gauge including a directional antenna, said radar level gauge being mounted to said attachment device,
   such that, when said attachment device is secured against the tank wall, the directional antenna is positioned so as to enable transmission of radar signals through the tank wall, thereby enabling determination of a filling level of a product in the tank.

2. The arrangement according to claim 1, wherein said attachment device comprises at least one suction cup configured to be secured to the tank wall by means of partial vacuum.

3. The arrangement according to claim 2, comprising at least two suction cups and a structure extending between the suction cups, and wherein said radar level gauge is mounted to said structure, in a position intermediate said suction cups.

4. The arrangement according to claim 2, wherein the at least one suction cup includes a connection terminal configured to be connected to an active source of sub-atmospheric pressure.

5. The arrangement according to claim 4, further comprising an active source of sub-atmospheric pressure connected to said terminal.

6. The arrangement according to claim 5, wherein said active source is a pump.

7. The arrangement according to claim 2, wherein the at least one suction cup is configured to allow a user to create the partial vacuum by mechanical operation of the suction cup.

8. The arrangement according to claim 7, wherein the suction cup includes:
   a body having a ring-shaped surface;
   a bellows resting against the ring-shaped surface, the bellows configured to be placed between the body and the tank wall; and
   a bellows operating member operatively attached to a portion of said bellows located within said ring-shaped surface, said bellows operating member being movably arranged with respect to the body between a first state, wherein said bellows is in a first position in relation to a plane of said ring-shaped surface, and a second state, in which said portion is in a second position, further away from said plane than said first position;
   such that, when the suction device is placed with the bellows sandwiched between the ring-shaped surface and the tank wall, and the bellows operating member is brought to its second state, said portion is pulled away from the tank wall, thereby creating said partial vacuum between the bellows and the tank wall.

9. The arrangement according to claim 8, wherein the ring-shaped surface has a width d of at least three millimeters.

10. The arrangement according to claim 9, wherein the ring-shaped surface has a width d of at least five millimeters.

11. The arrangement according to claim 8, wherein an adhesive is applied at least to an outer perimeter of said bellows, such that, when the suction cup is secured to the tank wall, said adhesive is pressed against the tank wall so as to create an adhesive bond.

12. The arrangement according to claim 1, wherein the radar level gauge is pivotably mounted to the attachment device, so that, when the attachment device is secured to the tank wall, an orientation of the directional antenna is adjustable with respect to a surface of the product in the tank.

13. A tank arrangement comprising:
a tank for storing a product, and having tank walls of a material which is impermeable to the product and transmissive to radar signals, and
an arrangement according to claim 1.

14. A radar level gauging arrangement for performing radar level gauging through a tank wall which is impermeable to a product held in the tank and transmissive to radar signals, comprising:
a suction cup including:
a main body having an inner ring-shaped surface and an outer ring-shaped surface, said inner and outer ring-shaped surfaces substantially extending in one single attachment plane,
an annular bellows having an inner perimeter surrounding a central opening and an outer perimeter, a first side of said annular bellows configured to be placed against said tank wall, and a second side, opposite to the first side, facing the body with the inner perimeter aligned with the inner ring-shaped surface and the outer perimeter aligned with the outer ring-shaped surface, and
a bellows operating member operatively attached to a portion of said bellows extending between the inner and outer perimeter, said bellows operating member being movably arranged in relation to the main body to pull said portion into said main body away from said attachment plane; and
a radar level gauge including a directional antenna, said radar level gauge being mounted to said body such that said directional antenna is directed towards said central opening,
such that, when said suction cup is placed against the tank wall and the bellows is pulled away from the attachment plane, a partial vacuum is created between the annular bellows and the tank wall thereby securing the suction cup and the radar level gauge with respect to the tank wall, whereby the directional antenna is positioned to emit radar signals through the tank wall in the central opening.

15. The arrangement according to claim 14, wherein the ring-shaped surfaces each has a width of at least three millimeters.

16. The arrangement according to claim 15, wherein the ring-shaped surfaces each has a width of at least five millimeters.

17. The arrangement according to claim 14, wherein an adhesive is applied at least to an outer perimeter of said bellows, such that, when the suction cup is secured to the tank wall, said adhesive is pressed against the tank wall so as to create an adhesive bond.

18. The arrangement according to claim 14, wherein the radar level gauge is pivotably mounted to the attachment device, so that, when the attachment device is secured to the tank wall, an orientation of the directional antenna is adjustable with respect to a surface of the product in the tank.

19. The arrangement according to claim 14, wherein said bellows operating member is a cylindrical sleeve coaxially arranged with said first and second ring shaped surfaces, said sleeve having a lower edge operatively attached to said bellows.

20. A method for performing radar level gauging in a tank having a radar transmissive tank wall,
providing a radar level gauge mounted to a suction cup;
placing a bellows of the suction cup against a substantially flat portion of said tank wall;
creating a partial vacuum between the bellows and the tank wall to secure the suction cup to the tank wall, thereby fixating the radar level gauge with respect to the tank wall;
emitting radar transmit signals through the tank wall;
receiving radar echo signals through the tank wall, said echo signals formed by reflection of the transmit signals in a product surface inside the tank; and
determining a filling level of the tank based on a relationship between the transmit signals and the echo signals.

21. The method according to claim 20, wherein the step of creating a partial vacuum includes mechanically operating the suction cup in order to displace a bellows in relation to the tank wall.

22. The method according to claim 20, wherein the step of creating a partial vacuum includes connecting the suction cup to an active source of sub-atmospheric pressure.

23. The method according to claim 20, further comprising adjusting the orientation of the radar level gauge with respect to the suction cup, in order to align a directional antenna of the radar level gauge with respect to the surface in the tank.

* * * * *